United States Patent [19]

Duyzings et al.

[11] Patent Number: 4,871,802

[45] Date of Patent: Oct. 3, 1989

[54] PROCESS FOR THE PREPARATION OF A THERMOPLASTIC WITH HIGH MONOMER CONVERSION

[75] Inventors: Wilhelmus G. Duyzings, Born; Lambert Van Lumig, Grathem, both of Netherlands

[73] Assignee: Stamicarbon B.V., Geleen, Netherlands

[21] Appl. No.: 153,930

[22] Filed: Feb. 9, 1988

[30] Foreign Application Priority Data

Feb. 9, 1987 [NL] Netherlands .......................... 8700292

[51] Int. Cl.$^4$ ...................... C08L 33/08; C08L 51/04
[52] U.S. Cl. ........................................ 525/84; 525/74; 525/80; 525/83; 525/85

[58] Field of Search ...................... 525/80, 316, 83, 84, 525/85

[56] References Cited

U.S. PATENT DOCUMENTS 4,539,375 9/1985 Dunkelberger ...................... 525/316

*Primary Examiner*—Jacob Ziegler
*Attorney, Agent, or Firm*—Cushman, Darby & Cushman

[57] ABSTRACT

The invention relates to a process for the preparation of a thermoplastic consisting of a vinylaromatic compound, acrylonitril and a butadiene rubber, by means of a two-step polymerization reaction characterized in that 0.1–10 wt. % of the butadiene rubber based on the entire composition, is replaced by an acrylate rubber in the second step. The process results in a decreased concentration of residual monomers.

6 Claims, No Drawings

PROCESS FOR THE PREPARATION OF A THERMOPLASTIC WITH HIGH MONOMER CONVERSION

The invention relates to a process for the preparation of a thermoplastic consisting of a vinylaromatic compound, acrylonitrile and a butadiene rubber, by means of a two-step polymerization reaction.

In many plastic applications in which a good combination of impact resistance, processability, surface properties and resistance to deformation at high temperatures is of primary importance, a graft copolymer of a vinylaromatic compound and acrylonitrile on a butadiene rubber (ABS) is used. ABS is for example used for the production of housing for different types of electrical equipment, but also for the production of certain car parts.

It is desirable that an ABS product with excellent properties can be produced.

One of the conditions desired in ABS polymerization is a low concentration of residual monomer in the vinylaromatic compound and the acrylonitrile. It is indeed easy to remove the residual monomer through stripping, but this is an expensive process. It is better to aim at the highest possible monomer conversion or, in other words, at the lowest possible concentration of residual monomer.

In U.S. Pat. No. 3,991,136 a monomer mixture of acrylate esters and/or vinyl acetate is added to the monomer mixture towards the end of the grafting process, that is, after approx. 90% conversion. This results in an increased conversion of the monomers still present in the emulsion. These additionally added monomers must then be removed by polymerization.

The aim of the invention is to provide an improved process for increased monomer conversion in the two-step polymerization of a vinylaromatic compound, acrylonitrile and a rubber. The process according to the invention is characterized in that 0.1-10 wt% of the butadiene rubber, based on the entire composition, is replaced by an acrylate rubber in the second step of the polymerization. This can for example be effected by replacing part of the butadiene rubber latex by an acrylate latex in an emulsion polymerization.

Surprisingly, it has now been found that the concentration of residual monomers is then lower than usual.

Preferably 2-6 wt% of butadiene latex, based on the entire composition, is replaced according to the invention by an acrylate latex. Acrylates with a Tg (glass transition temperature) below 0° C. may be used as acrylate latex. Preferably butyl acrylate and 2-ethylhexyl acrylate are used. The acrylate latex is obtained by means of emulsion polymerization of the monomer.

Two-step emulsion polymerization is described in EP-A-186.926. The first step of the graft copolymerization is carried out with addition of rubber latex. As decribed, the invention relates to the second step of the graft copolymerization, in which in addition to the extra monomers, emulsifier and initiator, rubber latex is also added.

In the preparation of the (graft) copolymer styrene, α-methylstyrene or derivatives substituted in the aromatic ring may be used as vinylaromatic compound. Suitable substituents are alkyl groups, such as a methyl group. Mixtures of two or more vinylaromatic compounds may also be used.

The graft copolymer and any copolymer to be used are preferably composed of the same monomers. However, it is also possible to prepare the graft copolymer with styrene and acrylonitrile as monomers, with the styrene and/or acrylonitrile in the copolymer being entirely or partly replaced by one or more other monomers such as α-methylstyrene or maleic anhydride.

Any rubber may in principle be used as rubber in the preparation of the graft copolymer. Preferably polybutadiene homopolymers or butadiene copolymers are used.

Both the rubber and the graft copolymer and the copolymer can be prepared in a manner known in the art. The common auxiliaries like chain length regulators, emulsifiers (emulsion polymerization) and compounds supplying free radicals may be used in the preparation thereof.

Suitable chain length regulators are organosulphuric compounds like the frequently used mercaptans, as well as the dialkyl dixanthogens, diaryl sulphides mercaptothiazoles, tetraalkylthiuram mono- and disulphides, etc., either separately or in mixtures, as well as hydroxyl compounds like terpinolenes. The chain length regulators used most frequently commercially are substantially the mercapto-compounds, of which the hydrocarbylmercaptans with 8-20 carbon atoms per molecule are at present being used frequently. More in particular, mercaptans with a tertiary alkyl group are preferably used.

The amount of organosulphuric compound may vary within wide limits, dependent on the mixture chosen, the specific compound, polymerization temperature, emulsifier and other variables relating to the formation. Good results can be obtained by using 0.01-5 parts by weight (per 100 parts by weight of monomer) of organosulphuric compound, preferably 0.05-2 parts by weight. Suitable organosulphuric compounds comprise n-octyl mercaptan, n-dodecyl mercaptam, tertiary dodecyl mercaptan, tertiary nonyl mercaptan, tertiary hexadecyl mercaptan, tertiary octadecyl mercaptan, tertiary eicosyl mercaptan, secondary octyl mercaptan, secondary tridecyl mercaptan, cyclododecyl mercaptan, cyclododecadienyl mercaptan, aryl mercaptan like 1-naphthalene thiol etc., bis(tetramethylthiuram disulphide), 2-mercaptobenzothiazole, etc. Mixtures of these compounds may also be used.

Widely differing compounds may be used as emulsifier, for instance disproportionated rosin soap, fatty acid soap, mixtures of these compounds, aryl sulphonates, alkylaryl sulphonates and other surfactants and mixtures thereof. Non-ionic emulsifiers may also be used, for instance polyethers and polyols. The amount of emulsifier to be used depends on the type, as well as the reaction parameters and the concentrations of polymerizable monomer in the emulsion polymerization system.

Suitable compounds supplying free radicals for the emulsion polymerization process are organic or inorganic peroxides, hydroperoxides, azo compounds, as well as redox initiator systems. These compounds may be added at the beginning of the polymerization. It is also possible to add part of these compounds at the beginning of the process and part in the course of polymerization.

Preferably, alkali or ammonium persalts and/or redox systems are used as initiators. Particularly potassium persulphate, ammonium persulfate and sodium persulphate are to be mentioned. Examples of suitable redox systems are persalts (for example perchlorates or persulphates), tertiary butyl hydroperoxide, cumene hydroperoxide, diisopropylbenzene hydroperoxide and methyl cyclohexyl hydroperoxide, combined with reducing agents based on acids containing sulphur in a low valency, for instance sodium formaldehyde sulphoxylate, bisulphide, pyrosulphide, or with organic bases like triethanolamine, with dextrose, sodium pyrophosphate and mercaptans or combinations thereof, if so desired combined with metal salts like ferrosulphate. These initiators or initiator systems may be added in one go, stepwise or even gradually.

The invention will be elucidated with a few examples.

EXAMPLE

General process; unless otherwise indicated, the figures states are parts by weight.

Water (150), styrene (27), acrylonitrile (16), emulsifier (1.0; potassium salt of disproportionated dehydroabietic acid), chain length regulator (tertiary dodecyl mercaptan; T.D.D.M), polybutadiene latex (41.4), initiator (cumene hydroperoxide; 0.13), sodium pyrophosphate (0.14, NaP) and dextrose (0.19) were supplied to a test reactor. Subsequently, the polymerization was started and the mixture was stirred for one hour (70° C.).

The graft latex thus formed was mixed with a mixture consisting of styrene (26), acrylonitrile (8), water (50), chain length regulator T.D.D.M. (0.03) NaP (0.05) and dextrose (0.06), and initiator (0.13). To this a latex according to the examples was added.

The graft latex thus obtained was cooled, coagulated, washed and dried. The resultant powder was compounded with SAN to a rubber content of 24 wt%.

Of the thermoplastic obtained the Izod according to ISO 180 (kJ/m$^2$) and the gloss ($^o$/$_{oo}$) were determined.

EXAMPLES A THROUGH C AND I, II

According to the process, the composition of the latex added in the second step being varied. The results are given in table 1.

TABLE 1

| latex added in the 2nd step (parts by wt) | residual monomer % | | | Izod (kJ/m$^2$) | gloss (o/oo) |
|---|---|---|---|---|---|
| | AN** | S** | total | | |
| A — | 0.36 | 0.55 | 0.91 | 23 | 57 |
| B 4.6 PB (50% gel) | 0.30 | 0.53 | 0.83 | 31 | 56 |
| C 4.6 PB (80% gel) | 0.26 | 0.49 | 0.75 | 30 | 54 |
| I 4.6 butylacrylate* | 0.24 | 0.18 | 0.42 | 32 | 56 |
| II 4.6 2 EHA* | 0.25 | 0.20 | 0.45 | 32 | 56 |

*Butylacrylate (200 Å); EHA (2-ethylhexylacrylate, 700 Å)
**AN = acrylonitrile, S = styrene Examples I and II are according to the invention.

4.6 parts by wt of added latex equals 3.7 wt%, based on the entire composition.

We claim:

1. Process for the preparation of a thermoplastic consisting of a vinylaromatic compound, acrylonitrile and a butadiene rubber, by means of a two-step polymerization reaction, characterized in that 0.1–10 wt% of the butadiene rubber, based on the entire composition, is replaced by an acrylate rubber in the second step.

2. Process according to claim 1, characterized in that 2–6 wt% of butadiene rubber, based on the entire composition, is replaced by an acrylate rubber.

3. Process according to claim 1, characterized in that the glass transition temperature of the acrylate lies below 0° C.

4. Process according to claim 1, characterized in that butylacrylate, 1-ethylhexylacrylate or a combination of the two is used as acrylate rubber.

5. A process for the preparation of a thermoplastic comprising the steps of
   (1) partially polymerizing a vinylaromatic monomer, acrylonitrile monomer and a butadiene rubber to form a graft latex;
   (2) adding to the graft latex formed in step (1) vinylaromatic monomer, acrylonitrile monomer and an acrylate rubber in an amount sufficient to yield a thermoplastic wherein the total rubber content is from 0.1 to 10 wt.% acrylate rubber and from 99.9 to 90 wt.% butadiene rubber; and
   (3) polymerizing the mixture resulting from step (2) to completion.

6. The process of claim 5 additionally comprising the steps of cooling, coagulating, washing and drying.

* * * * *